(12) United States Patent
Lin

(10) Patent No.: US 8,070,072 B2
(45) Date of Patent: Dec. 6, 2011

(54) METHOD FOR CONTROLLING DIGITAL SHOWER SYSTEM

(75) Inventor: Jing-Yang Lin, Taichung County (TW)

(73) Assignee: Globe Union Industrial Corp., Taichung County (TW)

( * ) Notice: Subject to any disclaimer, the term of this patent is extended or adjusted under 35 U.S.C. 154(b) by 371 days.

(21) Appl. No.: 12/277,316

(22) Filed: Nov. 25, 2008

(65) Prior Publication Data

US 2010/0127087 A1    May 27, 2010

(51) Int. Cl.
G05D 23/13 (2006.01)
G05D 23/00 (2006.01)
E03C 1/04 (2006.01)

(52) U.S. Cl. ............................ 236/12.12; 236/94; 4/676

(58) Field of Classification Search ............... 236/12.12, 236/94; 4/676; 392/474
See application file for complete search history.

(56) References Cited

U.S. PATENT DOCUMENTS

| 6,286,764 B1 * | 9/2001 | Garvey et al. ............... 236/12.12 |
| 6,351,603 B2 * | 2/2002 | Waithe et al. ................. 392/474 |
| 6,705,534 B1 | 3/2004 | Mueller |

* cited by examiner

*Primary Examiner* — Chen Wen Jiang
(74) *Attorney, Agent, or Firm* — Morris Manning & Martin LLP; Tim Tingkang Xia, Esq.

(57) ABSTRACT

A method for controlling a digital shower system includes the steps of: actuating the digital shower system for operation; detecting whether the system is in order or not, and if not, generating an error message; otherwise, performing the next step; entering a ready mode, for discharging in advance a water flow in an outlet pipe that does not reach a preset outlet water temperature; entering a shower mode, in which a desired message is input through a digital user interface, a water outlet is controlled by a control unit to continuously output water maintained at the same temperature as the preset outlet water temperature; and providing several preset power-off conditions for automatically turning off the digital shower system. The method may not only achieve the function of discharging water in advance, but also automatically shut off the water output in a certain time period, so as to save water.

5 Claims, 4 Drawing Sheets

METHOD FOR CONTROLLING DIGITAL SHOWER SYSTEM

BACKGROUND OF THE INVENTION

1. Field of the Invention

The present invention relates to a method for controlling a digital shower system, and more particularly to a control method capable of discharging water in advance and automatically shutting off the water output in a certain period of time so as to save water.

2. Related Art

Nowadays, people are paying more and more attention to the quality of their daily lives. Besides pursuing the comfort of habitation, they also have a high demand for daily used bathing equipments.

Currently, in a common water tap of a bathing equipment, a cold water inlet pipe, a hot water inlet pipe, a valve, and an outlet pipe are disposed within a body, and the body is provided with a handle connected to the valve. The cold water inlet pipe and the hot water inlet pipe are respectively used for supplying cold water and hot water. The outlet pipe is communicated with a water outlet at an end of the body. The valve is communicated with the cold water inlet pipe, the hot water inlet pipe, and the outlet pipe, and is connected to the handle. Therefore, the handle may not only drive the valve to adjust the quantity of the water flowing out of the outlet, but also drive the valve to change the communication of the outlet pipe with the cold water inlet pipe and the hot water inlet pipe so as to adjust the temperature of the water flowing out of the outlet.

Compared with an ordinary water tap, a water tap for shower is additionally provided with a shower water outlet in communication with a shower head via a water pipe. Moreover, the tap body is further provided with a water flow selector between the shower water outlet and a universal water outlet. The water flow selector protrudes from the tap body, such that a user may adjust and select whether to allow the water to flow out from the shower water outlet or the universal water outlet.

In the above structure, the handle is manually controlled by the user to adjust the quantity and pressure of the cold water and hot water flowing through the cold water inlet pipe and the hot water inlet pipe, so as to obtain an output water flow at a desired temperature through the universal water outlet, the outlet pipe, and the water pipe connected to the shower head or the water tap. However, the accuracy of manually controlling the temperature of the water flow is low, and the user has to directly touch the outlet water to sense whether the water temperature is within a preset temperature range or not. If the outlet water temperature is too high, the user may easily be scalded. If the outlet water temperature is too low in winters, the user may easily catch a cold and feel bad. In addition, during the manual adjustment of the temperature, the water has to be kept flowing out from the water outlet (the outlet pipe), thus resulting in the waste of water and also the increase of the water cost.

Therefore, in order to allow the user to directly set the outlet water temperature in a detected manner, a control panel is used for directly setting and controlling the temperature. U.S. Pat. No. 6,286,764 discloses a fluid and gas supply system, which includes a cold water source, a hot water source, a mixing device, a flow control valve, an outlet pipe, a shower head, and a user interface. The hot water source is provided with a hot water temperature sensor at an inlet end thereof for sensing the temperature of the inlet hot water. The cold water source and the hot water source are respectively provided with a cold water supply valve and a hot water supply valve for controlling the quantity of the inlet cold water and the quantity of the inlet hot water, and are both connected to the mixing device for mixing the cold water and the hot water. A cold water supply valve sensor is disposed between the cold water source and the mixing device, and a hot water supply valve sensor is disposed between the hot water source and the mixing device, for respectively sensing the quantity of the cold water flowing into the mixing device and the quantity of the hot water flowing into the mixing device.

A mixed water flow from the mixing device passes through the flow control valve and the outlet pipe, and then flows out from the shower head for the user to take a shower. A mixed fluid temperature sensor and a fluid and gas composition sensor are sequentially mounted between the mixing device and the flow control valve for respectively sensing the temperature and pressure of the mixed water flow. The outlet pipe is provided with a flow sensor for sensing the quantity of an outlet water flow provided to the user.

After the user inputs a desired outlet water temperature into a control unit through the user interface, the control unit simultaneously controls the cold water supply valve, the hot water supply valve, the mixing device, and the flow control valve, receives temperature and pressure information from the hot water temperature sensor, the mixed fluid temperature sensor, the fluid and gas composition sensor, and the flow sensor, and then accordingly controls the valves to obtain the outlet water temperature preset by the user.

Further, U.S. Pat. No. 6,705,534 discloses a shower control system, which includes two inlet pipes, a stem pipe, a shower head, and a mixing assembly. The two inlet pipes are respectively used for supplying cold water and hot water. A solenoid is disposed between each inlet pipe and the stem pipe. The solenoids are respectively used for controlling the quantities of the inlet cold water and the inlet hot water. The mixing assembly includes a pressure sensor, a temperature sensor, and a control assembly. The pressure sensor and the temperature sensor are mounted on the stem pipe. A power assembly is provided for supplying power to the control assembly. The control assembly is electrically connected to the solenoids, the pressure sensor, and the temperature sensor. After a user inputs a desired outlet water temperature through the control assembly, the control assembly changes the quantities of the inlet cold water and the inlet hot water, receives information sent by the pressure sensor and the temperature sensor, compares the water temperature input by the user according to the received information, and then controls the solenoids until the outlet water temperature matches the water temperature input by the user.

Although the above structures and methods allow the user to directly input the desired outlet water temperature without sensing the outlet water temperature by directly touching the water, a lot of water is wasted in controlling the outlet water temperature. In addition, as the water flow previously left in the hot water source that does not reach the preset outlet water temperature and the water flow in the outlet pipe cannot be discharged in advance, even when the user intends to take a shower after the cold water and the hot water are mixed, the user is bound to first contact the water flow previously left in the hot water source that does not reach the preset outlet water temperature and the water flow in the outlet pipe. As such, the water flow output at first is not at the temperature preset by the user. Moreover, if the user leaves the shower room for other business and forgets to turn off the shower equipment, the shower equipment is still on and cannot be automatically turned off to compensate for the inattention of the user, thus resulting in the waste of water.

Therefore, it is the problem in urgent need of solutions to provide a method for controlling a shower system. The method allows the user to digitally input and adjust a preset outlet water temperature, and is capable of discharging water in advance before the shower system is used and automatically shutting off the water output during a shower if the user does not use the shower system in a certain period of time, so as to save the water.

SUMMARY OF THE INVENTION

Accordingly, the present invention is directed to a method for controlling a digital shower system, so as to discharge in advance a water flow previously left in an outlet pipe before an outlet water flow at a temperature preset by a user is output.

The present invention is also directed to a method for controlling a digital shower system, so as to automatically shut off the water output in a certain period of time when the user does not use the digital shower system without turning off the water output or when the user does not use the digital shower system after pausing without turning off the water output, thus saving water.

In order to achieve the above objectives, a method for controlling a digital shower system is provided. The digital shower system includes a cold water inlet pipe, a hot water inlet pipe, a mixing device with one end communicated with both the cold water inlet pipe and the hot water inlet pipe, an outlet pipe communicated with the other end of the mixing device, at least one water outlet communicated with the other end of the outlet pipe, a digital user interface, and a control unit. The cold water inlet pipe and the hot water inlet pipe are respectively provided with a check valve at positions adjacent to the mixing device. The mixing device is provided with a temperature sensor. The outlet pipe is provided with a control valve. The temperature sensor and the control valve are respectively electrically connected to the control unit. A user inputs a preset outlet water temperature through the digital user interface. The method includes the following steps:

Step A1: actuating the digital shower system for operation (power-on);

Step A2: detecting whether the system is in order or not, and if not, generating an error message; otherwise, performing the next step;

Step A3: entering a ready mode (RM), for discharging in advance a water flow in the outlet pipe that does not reach the preset outlet water temperature;

Step A4: entering a shower mode (SM), in which a desired message is input through the digital user interface, the control valve is controlled by the control unit to make the water continuously output from the water outlet and remain at the same temperature as the preset outlet water temperature, and several preset power-off conditions are provided; and Step A5: automatically turning off the digital shower system by the preset power-off conditions (power-off).

Step A3 of entering the RM includes the following steps:

Step R1: turning on the RM, so as to discharge water in the hot water inlet pipe in advance;

Step R2: detecting by the temperature sensor whether an outlet water flow flowing toward the outlet pipe is at the same temperature as the preset outlet water temperature, and if not, returning to Step R1; otherwise, performing the next step;

Step R3: discharging water for three seconds; and

Step R4: stopping the water discharge and turning off the RM, so as to enter the SM.

Preferably, the digital user interface is provided with a plurality of keys including several function keys and several number keys, and a first preset power-off condition out of the preset power-off conditions includes the following steps:

Step B1: turning on the SM; and

Step B2: determining whether the keys of the digital user interface are used in five minutes or not, and if yes, entering a setting screen and completing the setting of the water outlet by the digital user interface; otherwise, performing Step A5.

Preferably, a second preset power-off condition out of the preset power-off conditions is performed after completing the setting by the digital user interface in Step B2, and the second preset power-off condition includes the following steps:

Step C1: determining whether the digital user interface is used in twenty minutes or not, and if yes, keeping outputting water from the water outlet; otherwise, performing the next step;

Step C2: stopping outputting water from the water outlet; and

Step C3: determining whether the function keys of the digital user interface are used in five minutes or not, and if yes, resuming to output water from the water outlet; otherwise, performing Step A5.

Preferably, a third preset power-off condition out of the preset power-off conditions is performed after resuming to output water from the water outlet in Step C3, the keys include a pause key, and the third preset power-off condition includes the following step:

Step D1: determining whether the digital user interface is used in ten minutes or not after the pause key is pressed down, and if yes, keeping outputting water from the water outlet; otherwise, performing Step C2.

Therefore, through the above control method of the present invention, a water flow previously left in the hot water pipe and/or the outlet pipe can be discharged in advance before an outlet water flow at an outlet water temperature preset by a user is output. Besides, the water output can be automatically shut off in a certain period of time when the user does not use the digital shower system without turning off the water output or when the user does not use the digital shower system after pausing without turning off the water output, thus saving water.

The detailed features and advantages of the present invention will be described in detail in the following embodiments. Those skilled in the arts can easily understand and implement the content of the present invention. Furthermore, the relative objectives and advantages of the present invention are apparent to those skilled in the arts with reference to the content disclosed in the specification, claims, and drawings.

BRIEF DESCRIPTION OF THE DRAWINGS

The present invention will become more fully understood from the detailed description given herein below for illustration only, and thus are not limitative of the present invention, and wherein.

DETAILED DESCRIPTION OF THE INVENTION

Preferred embodiments of the present invention are illustrated in detail below with the accompanying drawings.

Figure 1:
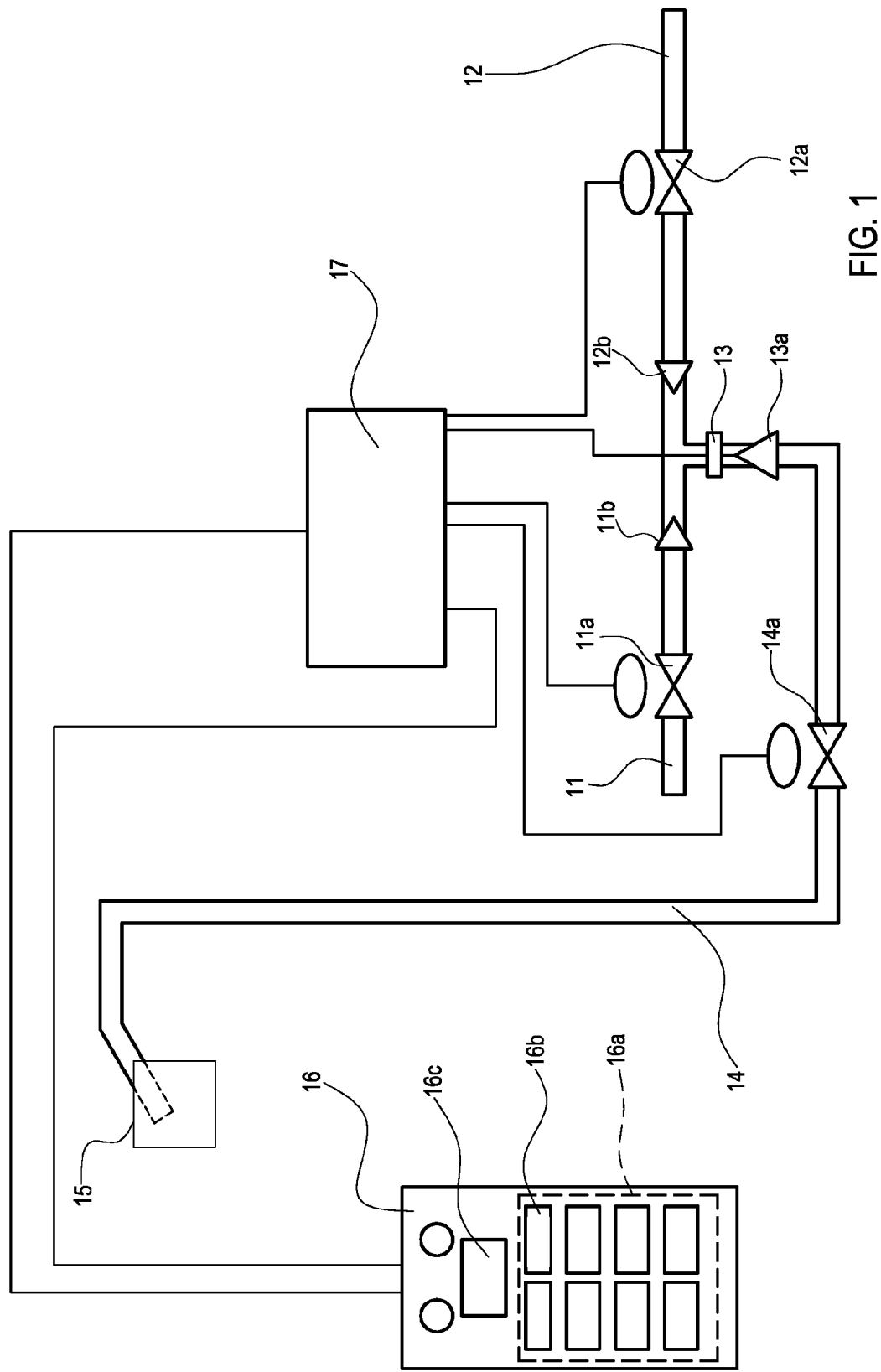
FIG. 1 is a schematic structural view of a digital shower system of the present invention.

FIG. 1 is a schematic structural view of a digital shower system of the present invention. Referring to FIG. 1, a digital shower system 1 of this embodiment includes a cold water inlet pipe 11, a hot water inlet pipe 12, a mixing device 13, an outlet pipe 14, a water outlet 15, a digital user interface 16, and a control unit 17. The cold water inlet pipe 11 may be provided with a flow control unit 11a, and the hot water inlet pipe 12 may be provided with a flow control unit 12a. The outlet pipe 14 is provided with a control valve 14a. The flow control units 11a and 12a as well as the control valve 14a are respectively electrically connected to the control unit 17. A user may input a preset outlet water temperature T through the digital user interface 16.

In addition, the cold water inlet pipe 11 and the hot water inlet pipe 12 are respectively provided with a check valve 11b and a check valve 12b at positions adjacent to the mixing device 13 for preventing the cold water or the hot water from flowing back into the other inlet pipe due to an excessive water pressure.

A plurality of water outlets 15 may be provided, and the control unit 17 is used to control the water outlet mode of the water outlets 15 into, for example, outputting water through a single water outlet, through two water outlets, or through three water outlets. Herein, the embodiment of the present invention is illustrated with regard to one water outlet.

When additionally provided, the flow control unit 11a and the flow control unit 12a are respectively used for controlling the quantities of a cold water flow and a hot water flow flowing into the mixing device 13. The mixing device 13 may be provided with a temperature sensor 13a at a water outlet portion thereof. The temperature sensor 13a is electrically connected to the control unit 17 for sensing the temperature of a primarily mixed water flow and sending the temperature value of the primarily mixed water flow to the control unit 17.

Moreover, the digital user interface 16 is electrically connected to the control unit 17 and provided with a plurality of keys 16a and a display element 16c. The keys 16a include number keys, function keys, and a pause key 16b. The display element 16c may be, but not limited to, a liquid crystal display (LCD) panel.

Therefore, through the above structure, once a user inputs information into the digital user interface 16, the digital user interface 16 transmits the information to the control unit 17 such that the control unit 17 controls the flow control unit 11a and the flow control unit 12a. After a cold water flow and a hot water flow are mixed by the mixing device 13, the temperature sensor 13a provides a sensed temperature value to the control unit 17 for controlling the control valve 14a disposed in the outlet pipe 14, such that the control valve 14a controls whether to output water from the water outlet 15 or not. Then, the temperature of the mixed water flow is adjusted by the mixing device 13 to be the temperature T input by the user through the digital user interface 16.

Figure 2:
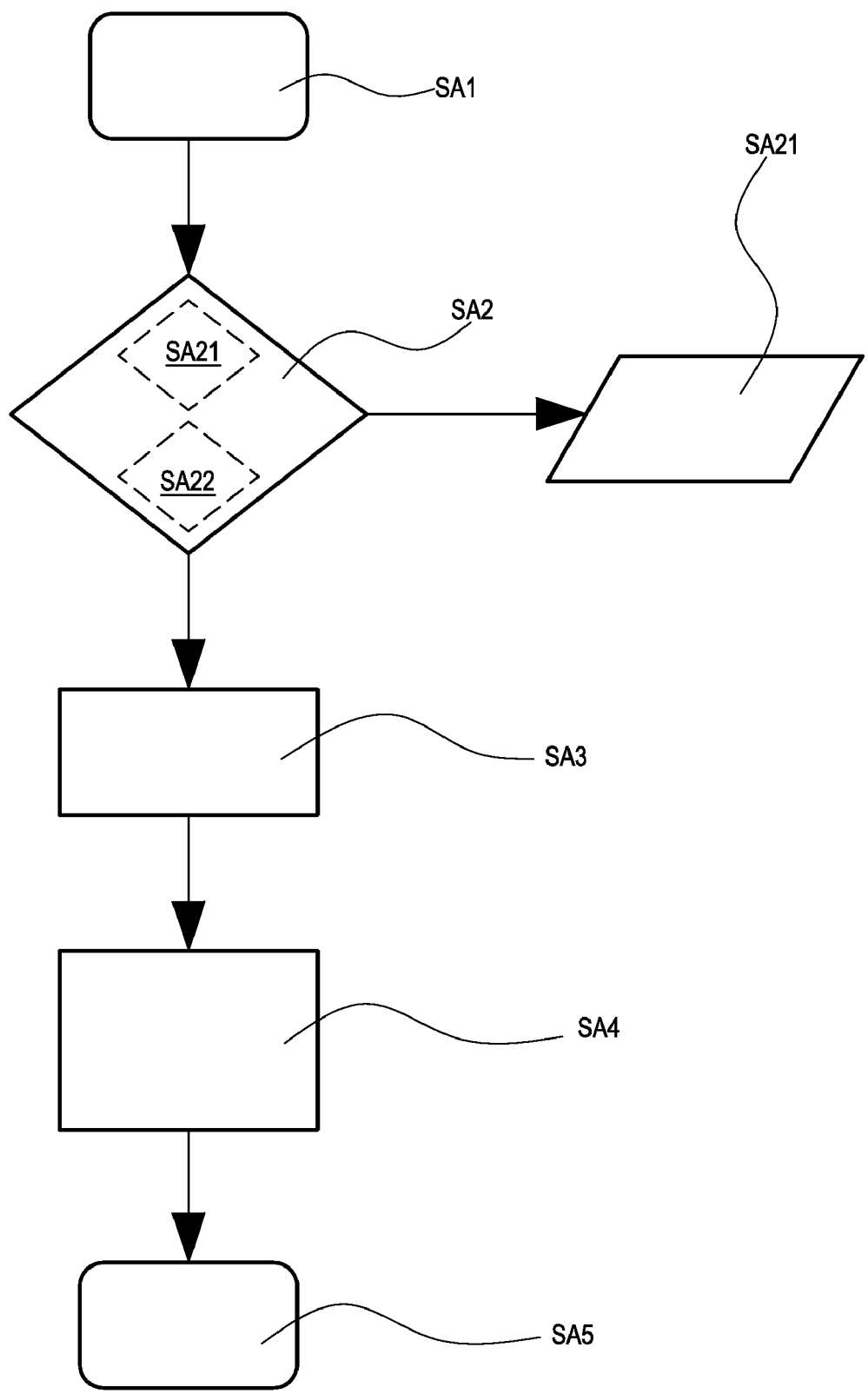
FIG. 2 is a flow chart of a method for controlling a digital shower system of the present invention.

FIG. 2 is a flow chart of a method for controlling a digital shower system of the present invention. Referring to FIG. 2, the method of the present invention includes the following steps:

Step SA1: actuating the digital shower system 1 for operation (power-on);

Step SA2: detecting whether the digital shower system 1 is in order or not, and if not, generating an error message (Step SA21); otherwise, performing the next step;

Step SA3: entering a ready mode (RM), for discharging in advance a water flow in the outlet pipe 14 that does not reach the preset outlet water temperature T;

Step SA4: entering a shower mode (SM), in which a desired message (the preset outlet water temperature T) is input through the digital user interface 16, the water outlet 15 is controlled by the control unit 17 to continuously output water maintained at the same temperature as the preset outlet water temperature T, and several preset power-off conditions are provided; and Step SA5: automatically turning off the digital shower system 1 by the preset power-off conditions (power-off).

In Step SA2, the control unit 17 detects whether the temperature sensor 13a feeds back a signal or not (Step SA21) and detects whether the mixing device 13 feeds back a signal or not (Step SA22), so as to detect whether the digital shower system 1 is in order or not.

Figure 3:
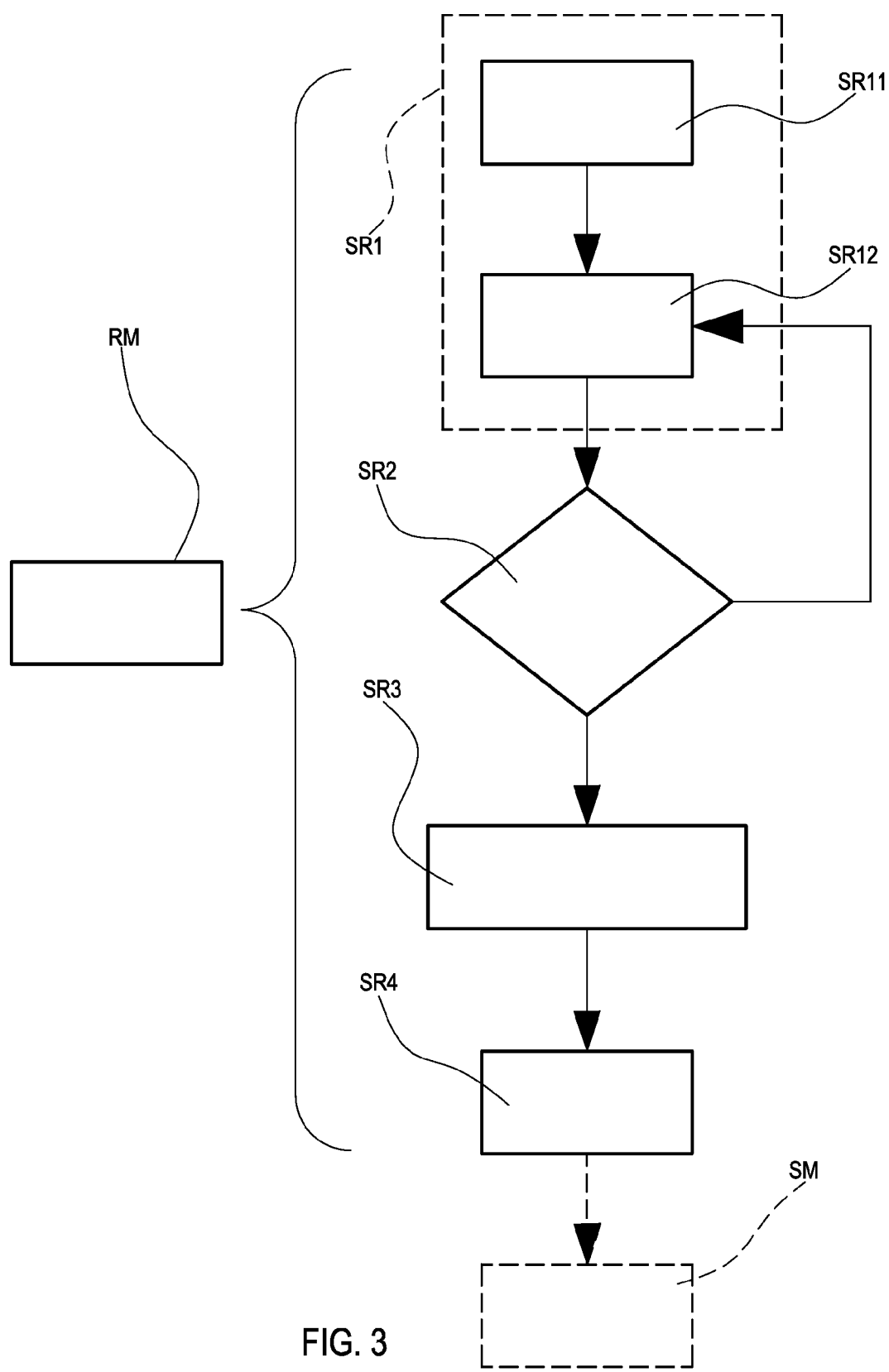
FIG. 3 is a flow chart of the present invention in an RM.

FIG. 3 is a flow chart of the present invention in an RM. Referring to FIG. 3, Step SA3 of entering the RM includes the following steps:

Step SR1: turning on the RM (Step SR11), so as to discharge water in the hot water inlet pipe 12 in advance (Step SR12);

Step SR2: detecting by the temperature sensor 13a whether an outlet water flow flowing toward the outlet pipe 14 is at the same temperature as the preset outlet water temperature T input by the user through the digital user interface 16, and if not, returning to Step SR1 (Step SR12); otherwise, performing the next step;

Step SR3: discharging water for three seconds; and

Step SR4: stopping the water discharge and turning off the RM, so as to enter the SM.

Figure 4:
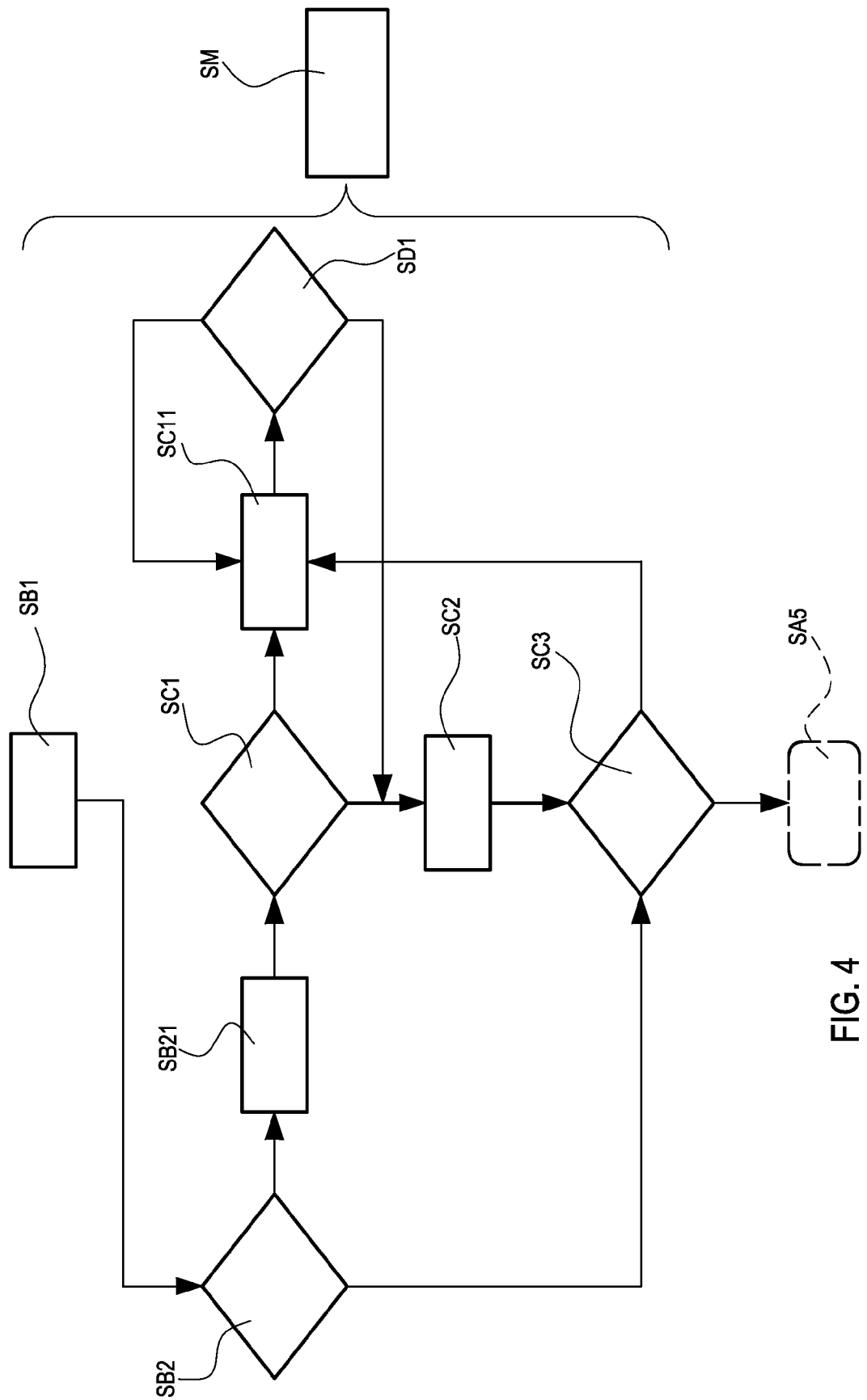
FIG. 4 is a flow chart of the present invention in an SM.

FIG. 4 is a flow chart of the present invention in an SM. The SM is entered after the function of discharging water in advance in the RM is completed (Step SA4). A first preset power-off condition in Step SA4 includes the following steps:

Step SB1: turning on the SM; and

Step SB2: determining whether the keys 16a of the digital user interface 16 are used in five minutes or not, and if yes, entering a setting screen and completing the setting of the water outlet 15 by the digital user interface 16 (Step SB21); otherwise, performing Step SA5.

A second preset power-off condition out of the preset power-off conditions in Step SA4 is performed after completing the setting by the digital user interface 16, and the second preset power-off condition includes the following steps:

Step SC1: determining whether the digital user interface 16 is used in twenty minutes or not, and if yes, keeping outputting water from the water outlet 15 (Step SC1); otherwise, performing the next step;

Step SC2: stopping outputting water from the water outlet 15; and

Step SC3: determining whether the keys 16a of the digital user interface 16 are used in five minutes or not, and if yes, resuming to output water from the water outlet 15; otherwise, performing Step SA5.

A third preset power-off condition out of the preset power-off conditions in Step SA4 is performed after resuming to output water from the water outlet 15, and the third preset power-off condition includes the following step:

Step SD1: determining whether the digital user interface 16 is used in ten minutes or not after the pause key 16b is pressed down, and if yes, keeping outputting water from the water outlet 15 (Step SC1); otherwise, performing Step SC2.

Therefore, through the above structure and control method of the present invention, a water flow previously left in the hot water pipe and/or the outlet pipe can be discharged in advance before an outlet water flow at an outlet water temperature preset by a user is output. Besides, the water output can be automatically shut off in a certain period of time when the user does not use the digital shower system without turning off the water output or when the user does not use the digital shower system after pausing without turning off the water output, thus saving water.

The above descriptions are only illustrative, but not intended to limit the present invention. Various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A method for controlling a digital shower system, wherein the digital shower system comprises a cold water inlet pipe, a hot water inlet pipe, a mixing device with one end communicated with both the cold water inlet pipe and the hot water inlet pipe, an outlet pipe communicated with the other end of the mixing device, at least one water outlet communicated with the other end of the outlet pipe, a digital user interface, and a control unit, the mixing device is provided with a temperature sensor, the outlet pipe is provided with a control valve, the temperature sensor and the control valve are respectively electrically connected to the control unit, and a user inputs a preset outlet water temperature through the digital user interface, the method comprising:
   Step A1: actuating the digital shower system for operation (power-on);
   Step A2: detecting whether the system is in order or not, and if not, generating an error message; otherwise, performing the next step;
   Step A3: entering a ready mode (RM), for discharging in advance a water flow in the outlet pipe that does not reach the preset outlet water temperature;
   Step A4: entering a shower mode (SM), wherein a desired message is input through the digital user interface, the control valve is controlled by the control unit to make the water continuously output from the water outlet and remain at the same temperature as the preset outlet water temperature, and several preset power-off conditions are provided; and
   Step A5: automatically turning off the digital shower system by the preset power-off conditions (power-off);
   wherein the digital user interface is provided with a plurality of keys at least comprising several function keys and several number keys, and a control method of a first preset power-off condition out of the preset power-off conditions comprises:
   Step B1: turning on the SM; and
   Step B2: determining whether the keys of the digital user interface are used in five minutes or not, and if yes, entering a setting screen and completing the setting of the water outlet by the digital user interface; otherwise, performing Step A5.

2. The method for controlling a digital shower system according to claim 1, wherein Step A3 of entering the RM comprises:
   Step R1: turning on the RM, so as to discharge water in the hot water inlet pipe in advance;
   Step R2: detecting by the temperature sensor whether an outlet water flow flowing toward the outlet pipe is at the same temperature as the preset outlet water temperature, and if not, returning to Step R1; otherwise, performing the next step;
   Step R3: discharging water from the water outlet for three seconds; and
   Step R4: stopping the water discharge and turning off the RM, so as to enter the SM.

3. The method for controlling a digital shower system according to claim 1, wherein a second preset power-off condition out of the preset power-off conditions is performed after completing the setting by the digital user interface in Step B2, and the second preset power-off condition comprises:
   Step C1: determining whether the digital user interface is used in twenty minutes or not, and if yes, keeping outputting water from the water outlet; otherwise, performing the next step;
   Step C2: stopping outputting water from the water outlet; and
   Step C3: determining whether the keys of the digital user interface are used in five minutes or not, and if yes, resuming to output water from the water outlet; otherwise, performing Step A5.

4. The method for controlling a digital shower system according to claim 3, wherein a third preset power-off condition out of the preset power-off conditions is performed after resuming to output water from the water outlet in Step C3, the keys comprise a pause key, and the third preset power-off condition comprises:
   Step D1: determining whether the digital user interface is used in ten minutes or not after the pause key is pressed down, and if yes, keeping outputting water from the water outlet; otherwise, performing Step C2.

5. The method for controlling a digital shower system according to claim 3, wherein the detection of whether the system is in order or not comprises:
   Step A21: detecting by the control unit whether the temperature sensor feeds back a signal or not; and
   Step A22: detecting whether the mixing device feeds back a signal or not.

* * * * *